Figure 1:
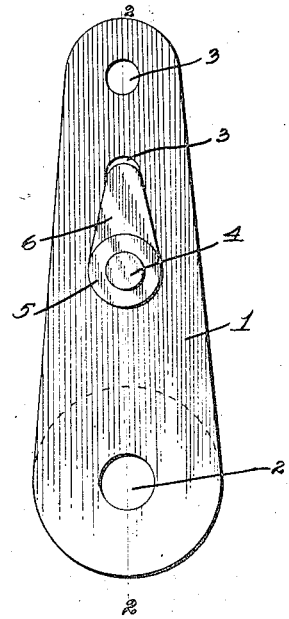

Aug. 28, 1923.

J. S. WINKLER

WRIST PIN

Filed May 8, 1922

1,466,325

J. S. Winkler,
Inventor

By
Attorney

Patented Aug. 28, 1923.

1,466,325

UNITED STATES PATENT OFFICE.

JOSEPH S. WINKLER, OF CHANUTE, KANSAS.

WRIST PIN.

Application filed May 8, 1922. Serial No. 559,324.

*To all whom it may concern:*

Be it known that I, JOSEPH S. WINKLER, a citizen of the United States, residing at Chanute, in the county of Neosho and State of Kansas, have invented a new and useful Wrist Pin, of which the following is a specification.

By way of explanation it may be stated that in a known form of drilling rig, motion is transmitted to the walking beam by way of a pitman, the pitman being operated by a wrist pin in a crank arm on a shaft. Considerable difficulty has been experienced, heretofore in keeping the wrist pin securely in place in the crank arm, and the present invention aims to provide novel means for overcoming the aforesaid difficulty.

Within the scope of what is claimed, a mechanic may make changes in the form delineated and described, without departing from the spirit of the invention.

In the drawings:—

Figure 2:
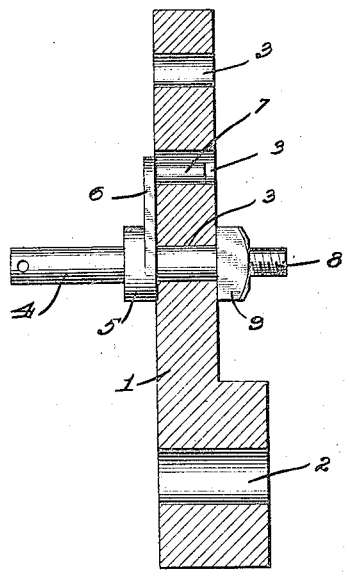

Figure 1 shows in elevation, a crank arm carrying a wrist pin constructed in accordance with the invention; Figure 2 is a section on the line 2—2 of Figure 1, parts appearing in elevation.

The numeral 1 marks a crank, which may form part of a drilling rig, as hereinbefore explained, the crank having an opening 2 adapted to receive the driving shaft (not shown). The crank 1 has openings 3, spaced part longitudinally of the crank, and in any of the openings 3, a wrist pin 4 is adapted to be mounted, for adjustment, to vary the throw. The wrist pin 4 has a hub 5 from which extends an arm 6, the arm having a stud 7 disposed parallel to the wrist pin 4 and adapted to be received in one of the openings 3. The wrist pin 4 is threaded as at 8 to receive a nut 9, the crank 1 being bound between the hub 5 and the arm 6 on the one hand, and the nut 9 on the other hand, the projecting stud 7 on the arm 6 cooperating with the nut and the hub to hold the wrist pin securely in the crank 1. The arm 6 projects outwardly toward the free end of the crank 1, in the drawings but, obviously, if the wrist pin were shifted to one of the outer openings 3 then, the arm 6 might be permitted to extend inwardly, the projecting stud 7 being received in the opening wherein the wrist pin is mounted in the present showing.

What is claimed is:—

1. In a device of the class described, a wrist pin provided intermediate its ends with an arm having a stud disposed approximately parallel to the wrist pin; and a holding device on one end of the wrist pin and cooperating with the arm.

2. In a device of the class described, a wrist pin provided intermediate its ends with a hub carrying a projecting arm, the arm having a stud disposed approximately parallel to the wrist pin; and a nut threaded on one end of the wrist pin and coacting with the hub and the arm.

3. In a device of the class described, a crank having openings; a wrist pin in one opening and supplied with an arm, the arm being provided with a projection received in the other opening; and means on the wrist pin for holding the wrist pin in the crank and for holding the projection in the last specified opening.

In testimony that I claim the foregoing as my own, I have hereto affixed my signature in the presence of two witnesses.

JOSEPH S. WINKLER.

Witnesses:
 HELEN HUBLER,
 E. E. LOFARER.